(12) United States Patent
Katsurahira

(10) Patent No.: US 8,089,008 B2
(45) Date of Patent: Jan. 3, 2012

(54) POSITION INDICATOR

(75) Inventor: Yuji Katsurahira, Kazo (JP)

(73) Assignee: Wacom Co., Ltd., Saitama (JP)

( * ) Notice: Subject to any disclaimer, the term of this patent is extended or adjusted under 35 U.S.C. 154(b) by 708 days.

(21) Appl. No.: 12/207,427

(22) Filed: Sep. 9, 2008

(65) Prior Publication Data

US 2009/0065268 A1 Mar. 12, 2009

(30) Foreign Application Priority Data

Sep. 11, 2007 (JP) .................. 2007-235966

(51) Int. Cl.
G06F 3/041 (2006.01)
G06F 3/033 (2006.01)
G01R 17/16 (2006.01)

(52) U.S. Cl. .................. 178/19.01; 324/76.67; 345/178; 345/179

(58) Field of Classification Search ................ 178/19.01
See application file for complete search history.

(56) References Cited

U.S. PATENT DOCUMENTS

| 5,679,930 A | 10/1997 | Katsurahira | |
| 7,038,666 B2 * | 5/2006 | Lo et al. | 345/173 |
| 2005/0127893 A1 * | 6/2005 | Matsubara | 324/76.67 |

FOREIGN PATENT DOCUMENTS

| JP | 7175572 A | 7/1995 |
| JP | 2001136081 A | 5/2001 |
| JP | 2005165768 A | 6/2005 |

* cited by examiner

Primary Examiner — Alexander S Beck
Assistant Examiner — Mihir Rayan
(74) Attorney, Agent, or Firm — Seed IP Law Group PLLC

(57) ABSTRACT

When a start pulse is supplied, a time-constant circuit (1) is charged to a voltage Vcc, and charge in a variable capacitor (C) is discharged through a resistor (R1). Upon the voltage (a) of the variable capacitor (C) reaching a preset reference voltage V1, a signal (b) is output from a comparator (2). In response to the signal (b), a time measuring circuit (3) stores a measured time period as a time period "T1", and at the same time a switching signal (c) is output. The switching signal (c) switches the reference voltage V1 to a reference voltage V2, which is slightly lower than the reference voltage V1, and further switches the resistor R1 to a resistor R2, which has higher resistance than the resistor R1. Upon the voltage (a) of the variable capacitor (C) reaching the reference voltage V2, the signal (b) is output from the comparator 2. In response to the signal (b), the time measuring circuit (3) stores a measured time period as a time period "T2".

11 Claims, 6 Drawing Sheets

R1<R2, V1>V2

R1<R2, V1<V2

R1<R2, V1<V2

POSITION INDICATOR

CROSS REFERENCES TO RELATED APPLICATIONS

The present application claims priority under 35 U.S.C. §119 from Japanese Patent Application JP 2007-235966 filed in the Japanese Patent Office on Sep. 11, 2007, the entire contents of which is incorporated herein by reference.

BACKGROUND OF THE INVENTION

1. Field of the Invention

The present invention relates to a position indicator, such as a stylus pen, capable of detecting operational information represented by a continuous variable and transmitting the detected operational information to a tablet.

2. Description of the Related Art

Examples of known position indicators are disclosed in Japanese Unexamined Patent Application Publication No. H07-175572, corresponding to U.S. Pat. No. 5,679,930, incorporated by reference herein. According to Japanese Unexamined Patent Application Publication No. H07-175572, operational information represented by a continuous variable, such as pen pressure, drawing line width, color/darkness, etc., is converted into a time period by a time-constant circuit. During the converted time period, the number of AC signal waves transmitted from a tablet is counted and encoded into a binary code, which is indicative of the detected continuous variable, to be sent back to the tablet. With such position indicators, the distance and positional relationship between the tablet and the position indicator do not affect detection of the continuous variable, and the continuous variable can be accurately detected with relatively low power consumption.

However, to further increase the accuracy and resolution of detection of a continuous variable, either the frequency of the signal to be transmitted from the tablet has to be increased, or the continuous variable detection time has to be lengthened. If the frequency is increased, the pen-tablet device as a whole will become expensive, and also the power consumption will be increased. If the continuous variable detection time is lengthened, detection number per unit time (sampling speed) will decrease.

To address the aforesaid challenges, according to Japanese Unexamined Patent Application Publication No. 2005-165768, corresponding to U.S. Patent Application Publication No. 2005/0127893, incorporated by reference herein, a continuous variable can be detected in a short period of time in high resolution, by measuring a time constant that can be switched between two types (or ranges) in a time-constant circuit including an element whose characteristic changes in response to the operational information (e.g., pen pressure).

Specifically, according to Japanese Unexamined Patent Application Publication No. 2005-165768, in order to predetermine the timing for switching between the two types of time constant, a rough measurement based on a smaller-value time constant is first performed before an actual measurement based on the two types of time constant is performed. The step of switching the time constant from a smaller value to a larger value, to thereby perform a high-resolution measurement, is carried out at a point when a time period slightly shorter than the predetermined period has elapsed. With such arrangement, a continuous variable can be detected in a short period of time and in high resolution.

However, according to Japanese Unexamined Patent Application Publication No. 2005-165768, since a measurement involving charging or discharging is performed twice (during the switching-timing predetermination measurement and an actual measurement), longer time is required, and further, the sampling speed will decrease if detection is performed in high resolution.

SUMMARY OF THE INVENTION

In view of the aforesaid challenges, it is an object of the present invention to provide a position indicator capable of rapidly detecting operational information represented by a continuous variable in a short period of time and in high resolution, and transmitting the detected information to a tablet.

A position indicator according to an aspect of the present invention is a position indicator for encoding operational information represented by a continuous variable and transmitting the encoded operational information to a tablet. The position indicator includes: a time-constant circuit adopted to encode the operational information represented by a continuous variable; a voltage comparison circuit; and a detection voltage setting circuit. The time-constant circuit includes a plurality of time-constant sub-circuits capable of being selectively switched between each other. The plurality of time-constant sub-circuits each has an element whose characteristic continuously changes in response to a change in the operational information represented by a continuous variable, and each has a time constant which changes in response to the change in the characteristic of the element. Each time constant has (i.e., varies within) a different variable range. The detection voltage setting circuit can selectively output a voltage value from a plurality of voltage values. The voltage comparison circuit compares a voltage output from the time-constant circuit with a voltage output from the detection voltage setting circuit, and based on the comparison result, the time constant of the time-constant circuit and the voltage value output from the detection voltage setting circuit are changed.

A method for detecting a continuous variable according to another aspect of the present invention includes generally three steps: (1) obtaining, as a first measured value, a time period from the time when charging or discharging of a time-constant circuit is started, where a time constant of the time-constant circuit is set to a value which varies in a first variable range and where a detection voltage of a voltage comparison circuit is set to a first voltage value, to the time when the voltage comparison circuit detects that a voltage output from the time-constant circuit has reached a value equivalent to the first voltage value; (2) upon obtaining the first measured value in step (1) above, setting the time constant of the time-constant circuit to a value which varies in a second variable range and further setting the detection voltage of the voltage comparison circuit to a second voltage value, and obtaining, as a second measured value, a time period from the time when the first measured value has been obtained to the time when the voltage comparison circuit detects that a voltage output from the time-constant circuit has reached a value equivalent to the second voltage value; and (3) encoding operational information represented by a continuous variable based on the first measured value and the second measured value and transmitting the encoded operational information to a tablet.

According to various exemplary embodiments of the present invention, since the detection voltage used by the voltage comparison circuit is switched at the same time as the time constant (or, more specifically, the variable range of the time constant) of the time-constant circuit is switched, it is not necessary to perform an operation for predetermining the first measured value (T1) (i.e., the time at which to switch from one time constant to the other time constant), and therefore a continuous variable can be rapidly detected in a short period of time and in high resolution.

DETAILED DESCRIPTION OF THE PREFERRED EMBODIMENT(S)

In the present invention, a device disclosed in Japanese Unexamined Patent Application Publication No. 2005-165768 has been improved, and the detection voltage used to detect whether or not a voltage output from a time-constant circuit is equal to or higher than a predetermined value is switched between two values.

The basic principle of the present invention will be described below with reference to FIG. 1 and FIG. 2.

Figure 1:
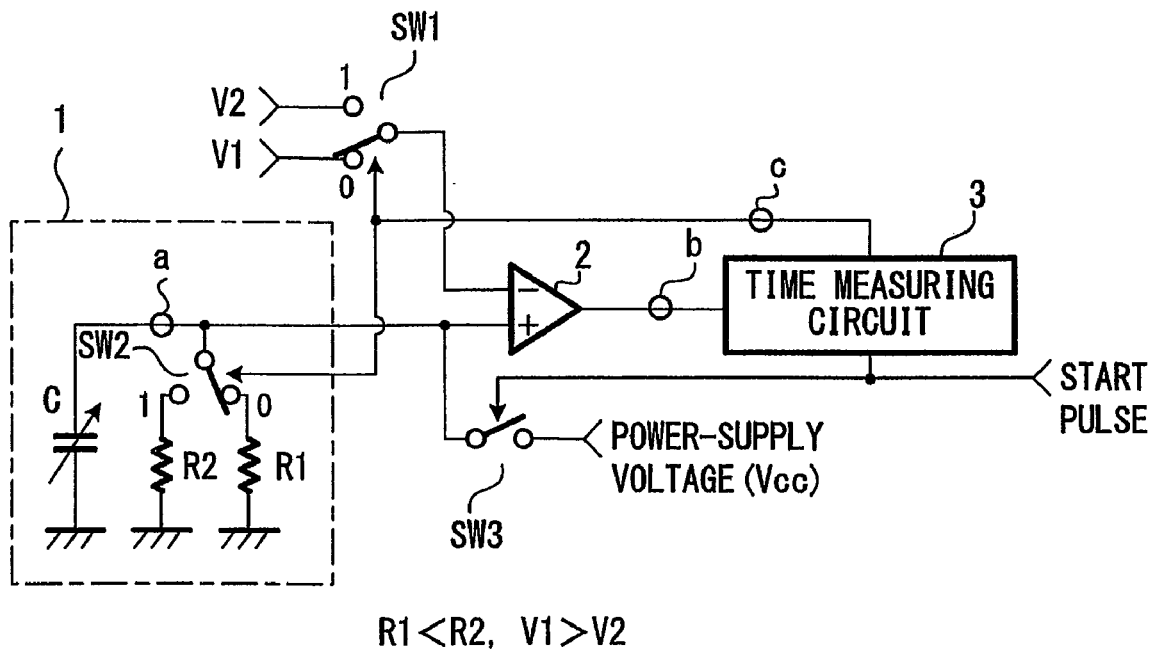
FIG. 1 is a circuit diagram showing a basic configuration for detecting a continuous variable according to one embodiment of the present invention.

FIG. 1 is a circuit diagram showing a basic configuration for detecting a continuous variable according to one embodiment of the present invention. As shown in FIG. 1, a non-inversion input terminal of a comparator 2 is connected to a time-constant circuit 1, which includes a variable capacitor C and resistors (R1, R2). The time constant of the time-constant circuit 1 can be switched between two types (i.e., two variable ranges), based on switching between the resistor R1 and the resistor R2.

The above-described configuration is identical to that disclosed in Japanese Unexamined Patent Application Publication No. 2005-165768. However, in the present invention, a reference voltage (i.e., the detection voltage) to be applied to an inversion input terminal of the comparator 2 can be switched between two values (V1, V2), simultaneously with switching of the time constant. An output terminal of the comparator 2 is connected to a time measuring circuit 3. A switching signal (c) is output from the time measuring circuit 3 to a switch SW2 and a switch SW1 for respectively switching the time constant and the reference voltage.

Figure 2:
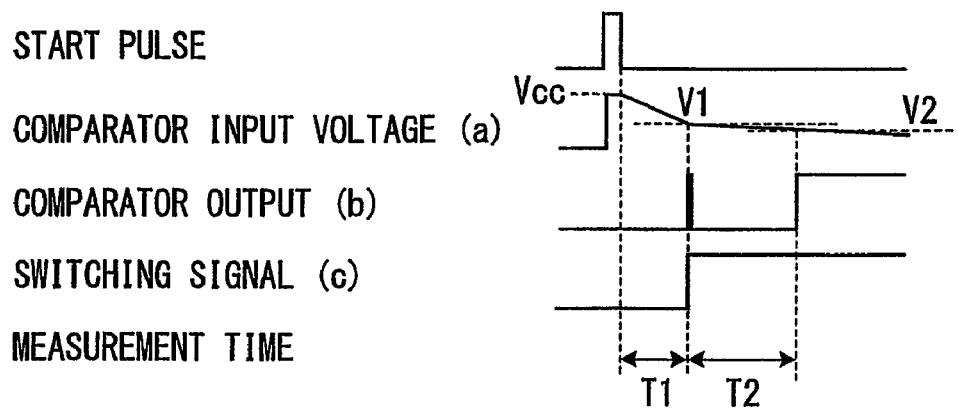
FIG. 2 is a waveform diagram explaining a basic operation of detecting a continuous variable according to one embodiment of the present invention.

FIG. 2 is a waveform diagram for explaining the basic operation of the circuit shown in FIG. 1. First, in the initial state, the switching signal (c) is "0". In such a case, the resistor R1 is selected as the resistor of the time-constant circuit 1 by the switch SW2, and a voltage V1 is selected as the reference voltage of the comparator 2 by the switch SW1. In this state, in response to the supply of a start pulse, a switch SW3 is closed, to thereby charge up the time-constant circuit 1 to a voltage Vcc. Immediately after the start pulse is stopped, the charge in the variable capacitor C is discharged through the resistor R1.

The time measuring circuit 3 starts a first time measurement in response to the trailing edge of the start pulse. When the voltage (a) of the variable capacitor C has reached the voltage V1, which is set as the reference voltage of the comparator 2, a signal (b) is output from the comparator 2. In response to the signal (b) output from the comparator 2, the time measuring circuit 3 stops the first time measurement and stores the measured time as "T1".

Upon stopping the first time measurement, the time measuring circuit 3 shifts the switching signal (c) to a high level "1" and, at the same time, starts a second time measurement. When the switching signal (c) is shifted to "1", the reference voltage of the comparator 2 is switched by the switch SW1 to a voltage V2 which is slightly lower than the voltage V1, and therefore the output signal (b) of the comparator 2 becomes a low level "0". At this time, since the resistor R2, which has higher resistance than the resistor R1, is selected by the switch SW2 as the resistor of the time-constant circuit 1, the discharging speed of the variable capacitor C becomes slower.

When the voltage (a) of the variable capacitor C has reached the reference voltage V2 of the comparator 2, the signal (b) is output from the comparator 2. In response to the rising edge of the signal (b) output from the comparator 1, the time measuring circuit 3 stops the second time measurement and stores the measured time as "T2".

A measurement time to be obtained in high resolution (referred to as "T" herein) is a time period it would take for the charge in the variable capacitor C to be discharged through the resistor R2 for the entire time until the voltage of the variable capacitor C reaches the second reference voltage V2. Such time T can be calculated using the following formula:

$$T = T2 + (T1 \times R2/R1)$$

Thus, a continuous variable in high resolution can be detected rapidly, based on a discharging time period, by increasing the ratio of R1 to R2 to a certain degree, without having to perform an actual measurement using only the resistor R2 (which may take a longer amount of time). Further, it is not necessary to perform a charge/discharge operation for predetermining a time equivalent to T1 for the purpose of determining the timing at which to switch from the resistor R1 to the resistor R2.

Figure 3A:
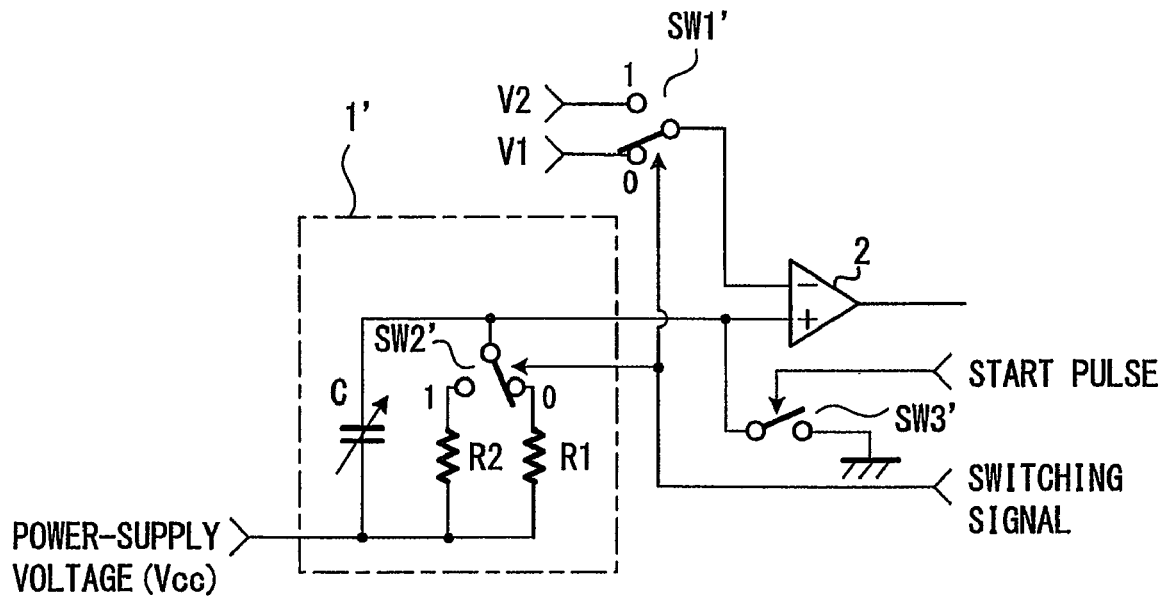
FIG. 3A and FIG. 3B are circuit diagrams showing other exemplary configurations of a time-constant circuit.
Figure 3B:
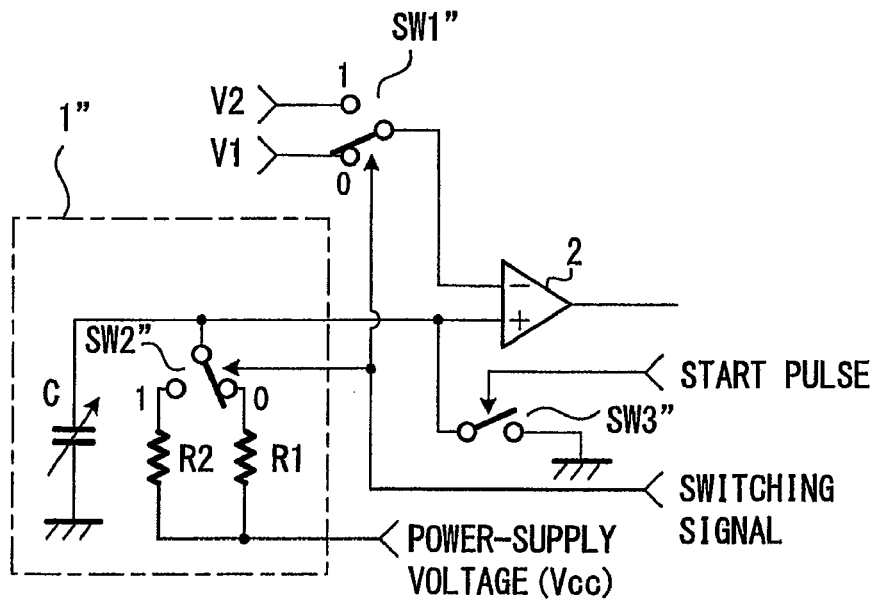

Incidentally, in addition to the configuration shown in FIG. 1, the time-constant circuit 1 of the present invention may take the configurations shown in FIG. 3A and/or FIG. 3B. Specifically, in the configuration shown in FIG. 3A, one end of the variable capacitor C is fixed to the Vcc, and the variable capacitor C is charged in response to the supply of a start pulse and then discharged via a switch SW2' through the resistor R1 or R2. In the configuration shown in FIG. 3B, one end of the variable capacitor C is fixed to a 0V (GND), and the variable capacitor C is charged in response to the supply of a start pulse and then discharged via a switch SW2" through the resistor R1 or R2. In both configurations shown in FIG. 3A and FIG. 3B, since the voltage of the non-inversion input terminal of the comparator 2 gradually rises after the start pulse is stopped, the reference voltage V1 is lower than the reference voltage V2 (V1<V2).

Figure 4:
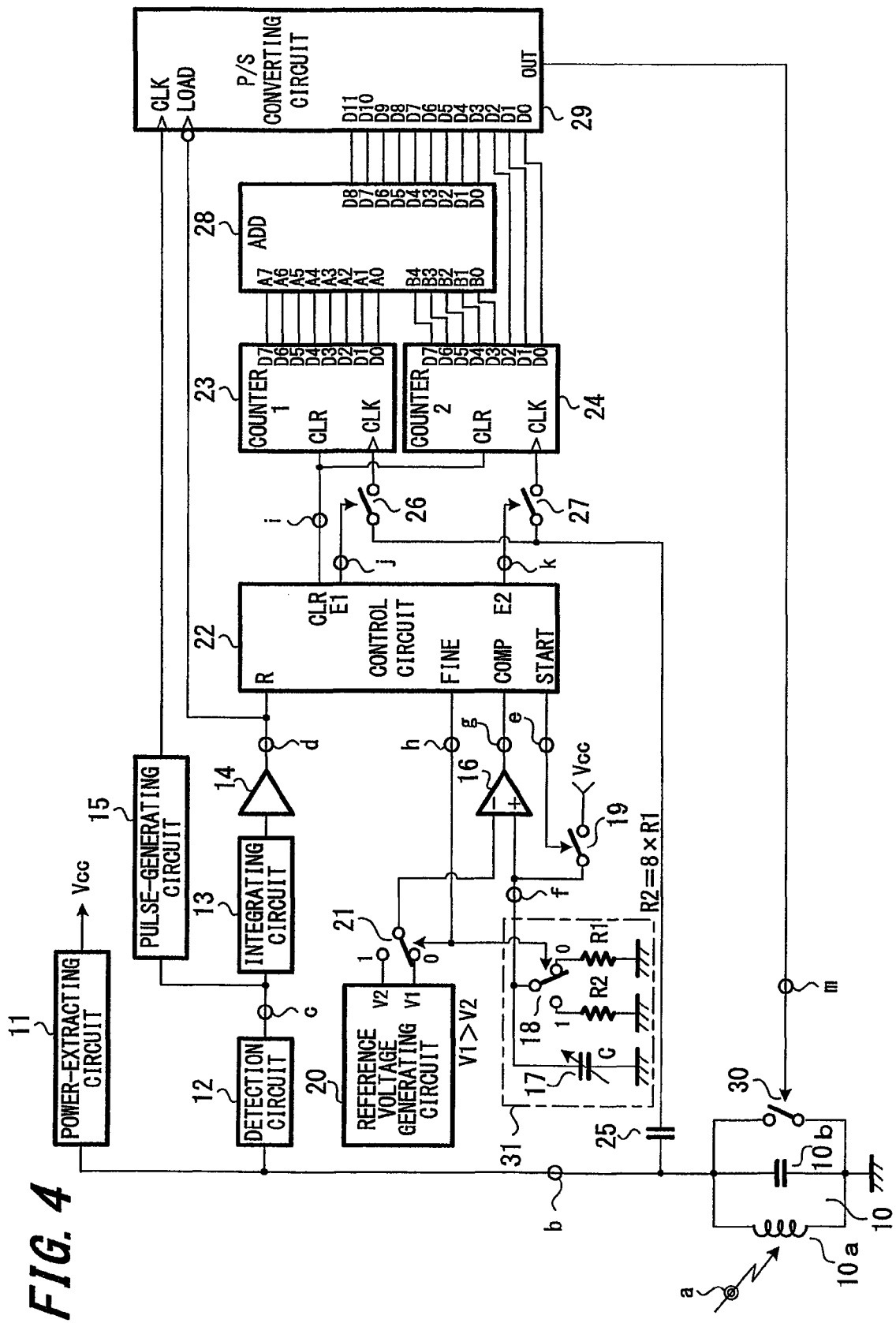
FIG. 4 is a circuit diagram showing a configuration of a position indicator according to one embodiment of the present invention.

FIG. 4 is a circuit diagram showing a configuration of a position indicator according to an embodiment of the present invention. In the embodiment shown in FIG. 4, the position indicator has a pen-like shape and is operated on a tablet, which will be described later. According to the embodiment, pen pressure is detected and transmitted to the tablet as a 12-bit binary code. That is, pen pressure is the continuous variable to be detected.

As shown in FIG. 4, a resonant circuit 10 is configured by a coil 10a and a capacitor 10b. Further, a power-extracting circuit 11 is provided to extract a power voltage from a signal generated by the resonant circuit 10 to be supplied to various circuitries, which will be described later. A detection circuit 12 generates clocks corresponding to the cycle lengths of transmission and intermission of the signals from the tablet.

The clocks output from the detection circuit 12 are supplied to an integrating circuit 13. The integration value of the integrating circuit 13 is supplied to a comparator 14 where the integration value is waveform-shaped based on a predetermined threshold voltage to be converted to a digital signal. In the present embodiment, the time constant of the integrating circuit 13 and the threshold value of the comparator 14 are set such that if the transmission of the signal from the tablet continues for a period of 300 µS or longer, a high level signal is output. Further, a pulse-generating circuit 15 generates a pulse having a predetermined time width (herein the time width is 70 µS) from the rising timing of the output signal from the detection circuit 12.

A variable capacitor 17 whose capacitance changes according to the pen pressure is connected to a comparator 16. A resistor R1 or a resistor R2 is connected in parallel with the variable capacitor 17, so that a time-constant circuit 31 is configured. Since the time-constant circuit 31 is configured by the variable capacitor 17 and the resistors R1, R2, the time constant thereof changes according to the pen pressure, within a certain range. Further, the time constant of the time-constant circuit 31 can be switched between two different variable ranges by switching between the resistor R1 and the resistor R2 with a switch 18.

As for the relationship between the resistor R1 and the resistor R2 forming the time-constant circuit 31, in the illustrated embodiment the resistance of the resistor R2 is exactly eight times higher than the resistor R1. By turning on a switch 19, the variable capacitor 17 is charged up to a power voltage Vcc. A reference voltage generating circuit 20 outputs a reference voltage V1 and a reference voltage V2.

Either the reference voltage V1 or the reference voltage V2 output from the reference voltage generating circuit 20 is selected by a switch 21 to be supplied to the comparator 16. In the illustrated embodiment, the reference voltage V1 is set to 50% of the power voltage Vcc, and the reference voltage V2 is set to 45% of the power voltage Vcc. A control circuit 22 generates various timing signals based on the signals output from the comparator 14 and comparator 16.

An 8-bit counter 23 and an 8-bit counter 24 are provided to count clocks CLK input from respective clock terminals and to output the counting values. Further, an AC signal generated by the resonant circuit 10 is supplied to the respective clock terminals of the counter 23 and the counter 24 through a capacitor 25, a switch 26 and a switch 27. Further, an adder circuit 28 adds 8-bit input data (A0-A7) supplied by the counter 23 and 5-bit input data (B0-B4) supplied by the counter 24, and outputs the result as 9-bit data (D0-D8).

Also provided is a parallel/serial converting circuit 29, which has a 12-bit shift register. The parallel/serial converting circuit 29 stores 12-bit data input from (D0-D11) thereof at the trailing edge of a signal (d) to be input to a LOAD terminal thereof, and thereafter outputs the data bit by bit from an OUT terminal thereof in synchronization with the clocks input to a CLK terminal thereof. Further, a switch 30 is controlled by the signal output from the parallel/serial converting circuit 29 to short-circuit or not short-circuit both ends of the resonant circuit 10. By controlling the switch 30 in such a manner, operational information represented by an encoded continuous variable (e.g., pen pressure) is included into an electromagnetic wave output by the resonant circuit 10 so as to be sent to the tablet.

Figure 5:
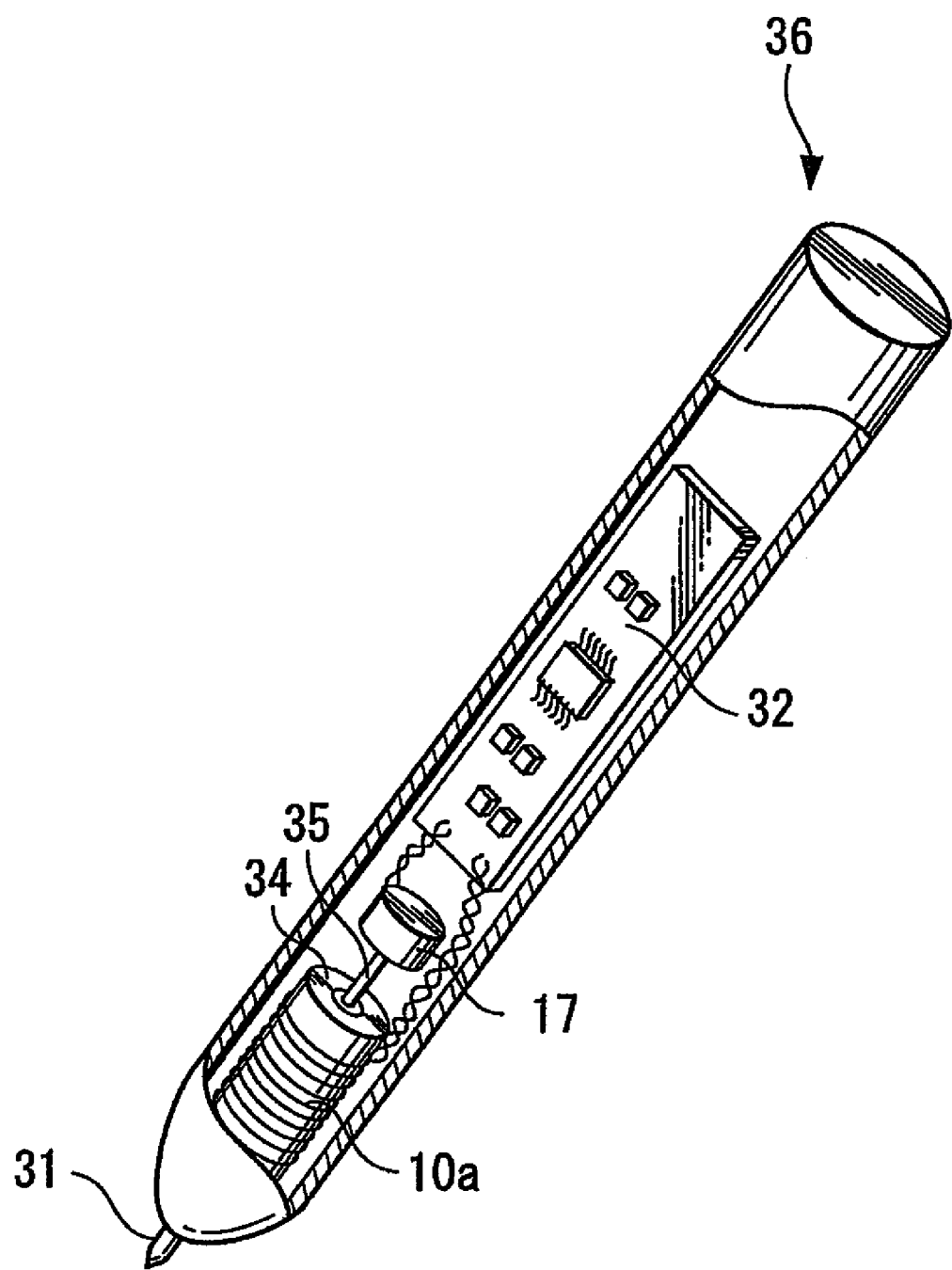
FIG. 5 is a view showing a configuration of a position indicator.

FIG. 5 shows the structure of a position indicator 36 having the configuration illustrated in FIG. 4. Incidentally, in FIG. 5, like components are denoted by like numerals as in FIG. 4, and the explanation thereof will be omitted.

As shown in FIG. 5, the position indicator 36 is provided with the coil 10a wound around a cylinder-shaped ferrite core 34, and the variable capacitor 17 whose capacitance changes according to the pen pressure. The variable capacitor 17 is pressed by a pressure applied to a pen tip 31 through a rod 35, which is passed through a hollow portion of the coil 10a. Further, each circuit component of the circuit diagram shown in FIG. 4 is mounted on a circuit board 32.

In order to explain the operation of the present embodiment, the configuration of the tablet will be briefly described below with reference to FIG. 6. The tablet herein has the same configuration as that described in Japanese Unexamined Patent Application Publication No. H07-175572 or Japanese Unexamined Patent Application Publication No. 2005-165768. A position detecting section 41 is provided with forty loop coils X1-X40 extended in an X-axis direction and forty loop coils Y1-Y40 extended in a Y-axis direction.

The loop coils are connected to a selecting circuit 42, which is provided for selecting respective loop coils of the position detecting section 41. The selecting circuit 42 is connected to a signal transmission/reception switching circuit 43. An amplifier 44 is connected to a receiving side terminal R of the transmission/reception switching circuit 43. The amplifier 44 is connected to a detection circuit 45. The detection circuit 45 is connected to a low-pass filter 46, and the low-pass filter 46 is connected to a sample-and-hold circuit 47. Further, the sample-and-hold circuit 47 is connected to an A/D conversion circuit 48, and the A/D conversion circuit 48 is connected to a CPU (Central Processing Unit) 49.

Various control signals are supplied from the CPU 49 respectively to the selecting circuit 42, the sample-and-hold circuit 47, the A/D conversion circuit 48 and the transmission/reception switching circuit 43. Further, an oscillator 50 generates an AC signal having substantially the same frequency as the resonance frequency of the resonant circuit 10, and supplies the AC signal to a terminal T of the transmission/reception switching circuit 43 through a current driver 51 which converts the AC signal to a current.

The operation of the present embodiment will be described below with reference to FIGS. 4 to 6. Similar to those described in Japanese Unexamined Patent Application Publication No. H07-175572 or Japanese Unexamined Patent Application Publication No. 2005-165768, the coordinate value of an indicated position is obtained by transmitting from the tablet for a predetermined period, and thereafter receiving a signal from the resonant circuit 10 of the position indicator 36. Since the operation of detecting the coordinate is known, the description thereof will be omitted herein.

Figure 6:
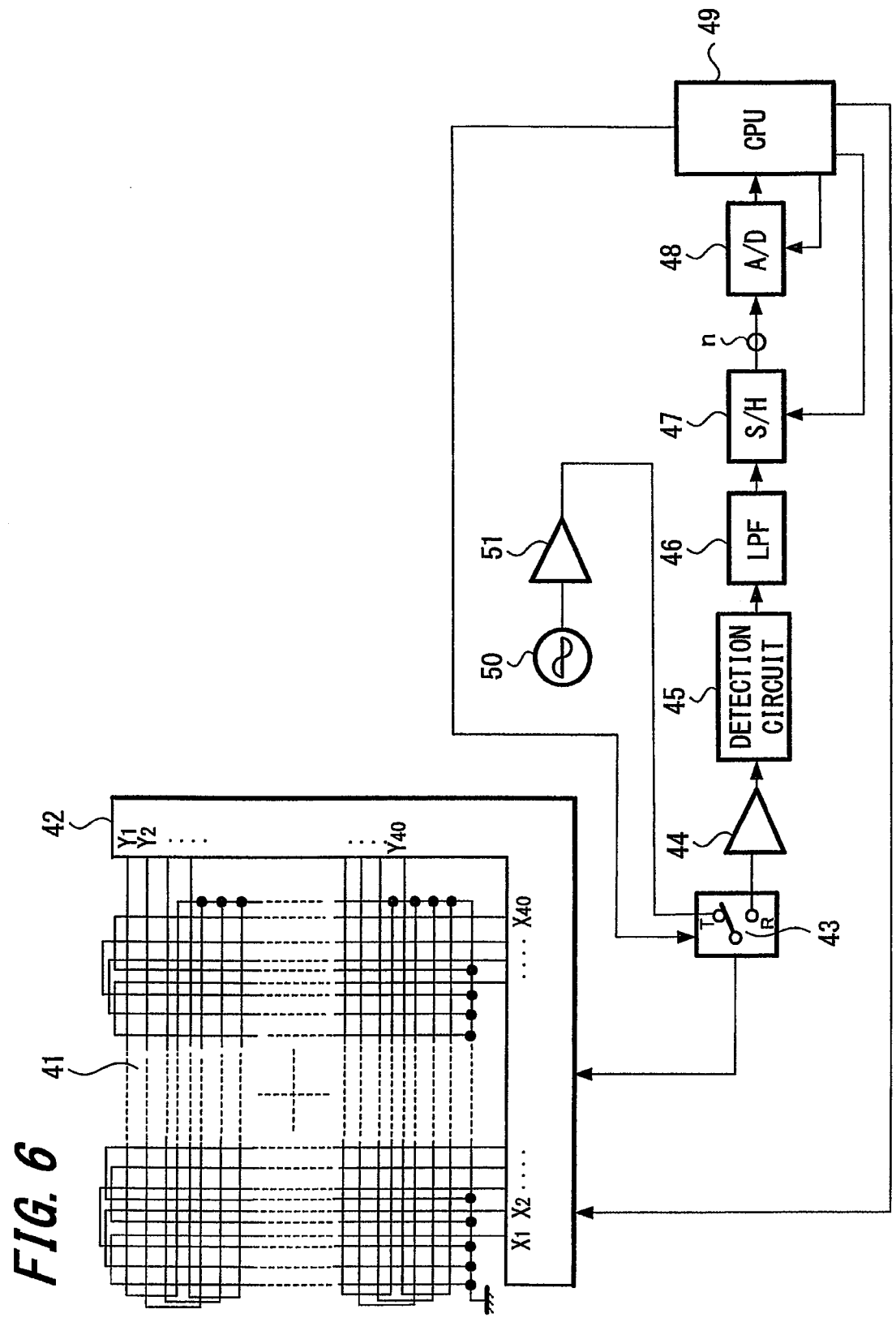
FIG. 6 a diagram showing a sample configuration of a tablet.
Figure 7:
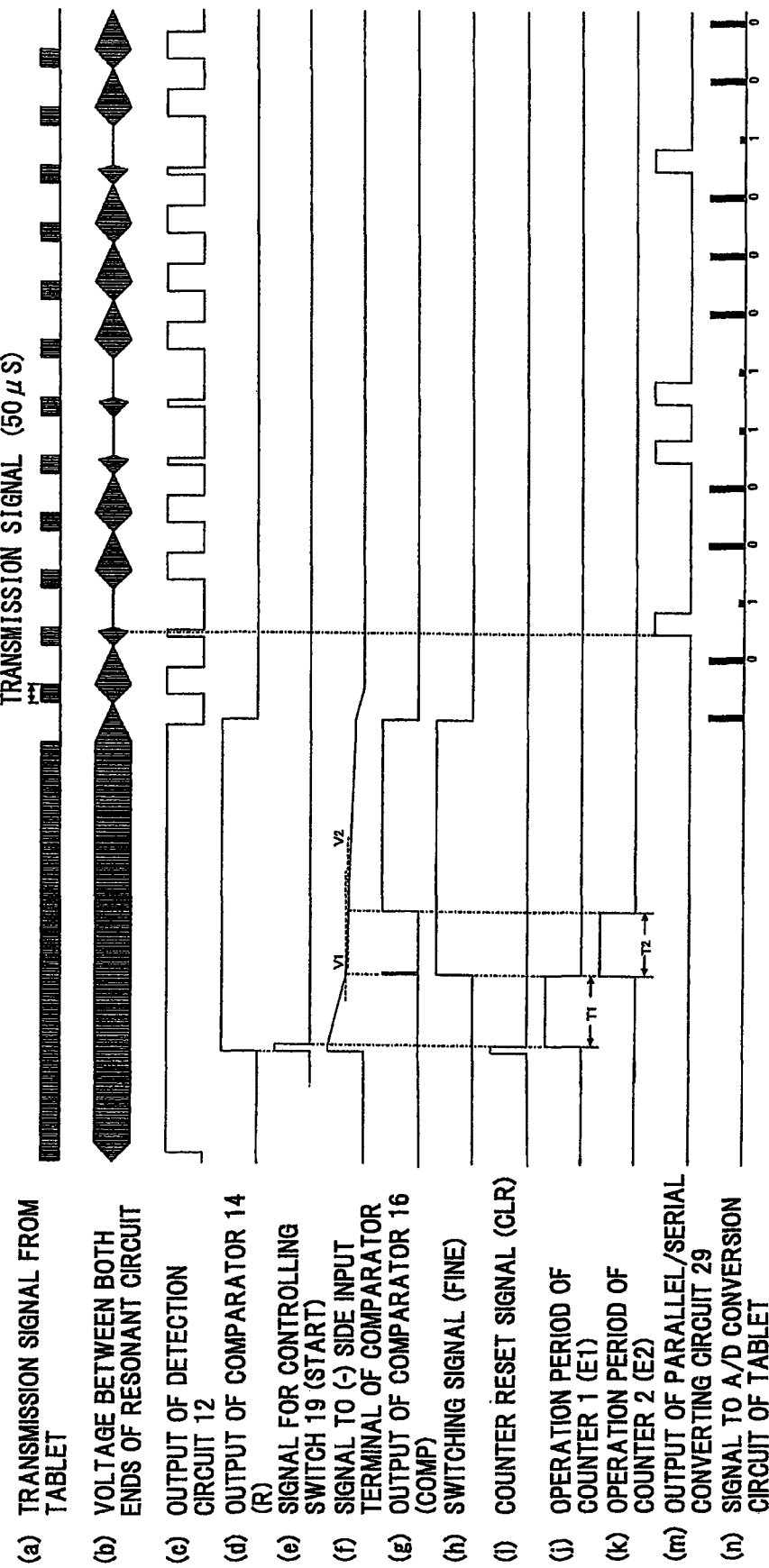
FIG. 7 is a waveform diagram showing operation waveforms of one embodiment of the present invention.

FIG. 7 explains an operation of the position indicator of the present embodiment shown in FIG. 4, wherein the position indicator detects, on the tablet shown in FIG. 6, pen pressure and transmits the detected pen pressure to the tablet as a 12-bit digital value. As shown in FIG. 7, waveforms (a)-(n) represent operating waveforms of portions indicated in FIG. 4 and FIG. 6, which are respectively marked with the same letters.

To perform a pen pressure detecting operation on the side of the position indicator 36, the CPU 49 provided in the tablet continuously transmits a signal for a period of about 1-2 mS. When about 300 µS elapses since the continuous transmission has started, a signal (d) is output from the comparator 14. In response to the output of the signal (d), the control circuit 22 starts an operation. First, a signal (e) for turning on the switch 19 is output from a START terminal of the control circuit 22.

In response to the signal (e), the variable capacitor 17 is charged up to the power voltage Vcc. In response to the trailing edge of the signal (e), a signal (j) for turning on the switch 26 is output from an E1 terminal of the control circuit 22. Thus, the counter 23 receives a clock signal and starts a counting operation. At this time, the value of "0" is output from a FINE terminal of the control circuit 22. Thus, the charge in the variable capacitor 17 is discharged through the switch 18 and the resistor R1.

A reference voltage V1 is applied to a (−) side input terminal of the comparator 16 through a switch SW21. As mentioned before, since the reference voltage V1 is set to 50% of the power voltage (Vcc) in the illustrated embodiment, upon the voltage between the both ends of the variable capacitor 17 reaching a value equivalent to the reference voltage V1, a signal (g) will be output from the comparator 16 (see signal (f) in FIG. 7).

In response to the output of the signal (g), the control circuit 22 shifts the value of the signal (j) output from the E1 terminal to "0" to stop the counting operation of the counter 23, and therefore the switch 26 is controlled to prohibit supplying the clock signal to the counter 23. The counter 23 outputs a time period "T1" to output terminals D0-D7, wherein the time period "T1" is equivalent to a time period while the value of the signal (j) is "1".

At the same time when the control circuit 22 shifts the value of the signal (j) output from the E1 terminal to "0", the control circuit 22 sets the value of a signal (k) output from an E2 terminal thereof to "1" to allow the counter 24 to start a counting operation. Based on the signal (k), the switch 27 is controlled to allow the clock signal to be supplied to the counter 24. Further, the control circuit 22 sets a switching signal (h) for switching the switch 18 and the switch 21 to a "1" value. It is preferred that these operations be simultaneously performed.

By setting the value of the switching signal (h) to "1", a resistor R2 is selected to be connected to the variable capacitor 17. Since the resistance of the resistor R2 is eight times higher than that of the resistor R1 in the illustrated embodiment, the discharging speed of the voltage (f) of the variable capacitor 17 is slowed to ⅛ compared to the case where the resistor R1 is selected. At this time, since the voltage supplied to the (−) side input terminal of the comparator 16 is changed to V2, which is 45% of the power voltage Vcc, the value of the signal (g) output from the comparator 16 immediately becomes "0".

Upon the voltage between the both ends of the variable capacitor 17 reaching a value equivalent to the reference voltage V2, the signal (g) is output from the comparator 16. The control circuit 22 controls the switch 27 to stop supplying the clock signal to the counter 24 by shifting the value of the signal (k), output from the E2 terminal thereof, to "0" in response to the signal (g), and the counting operation of the counter 24 is ended. The counter 24 outputs a time period "T2" to output terminals D0-D7, wherein the time period "T2" is equivalent to a time period while the value of the signal (k) is "1".

Since the measurement time T according to the present embodiment is defined as a time period it would take for the charge in the variable capacitor C to be discharged through the resistor R2 for the entire time until the time when the voltage of the variable capacitor C reaches the reference voltage V2, such time T can be calculated using the following formula:

$$T = T2 + 8 \times T1$$

The adder circuit 28 is a circuit for performing the calculation corresponding to the above formula. The calculated result is added to input terminals D0-D11 of the parallel/serial converting circuit 29, and these values are stored in the shift register provided inside the parallel/serial converting circuit 29 in response to the trailing edge of the signal (d) input from the LOAD terminal.

The aforesaid pen pressure detecting operation is performed during the period of continuous signal transmission by the tablet. When the continuous signal transmission period ends, the CPU 49 of the tablet performs a reception operation. The CPU 49 stores the value corresponding to half of a signal level to be detected at this time as a reference level to be used in data detection.

Then the CPU 49 alternately performs the operation of transmitting a signal having a time width of 50 μS and the operation of receiving a signal having a time width of 100 μS. These are alternated twelve times. By transmitting/receiving the signals twelve times, the CPU 49 outputs signals from the OUT terminal of the parallel/serial converting circuit 29 for controlling the switch 30.

At this time, in synchronization with the rising edge of the signal input to the CLK terminal, the parallel/serial converting circuit 29 sequentially outputs the values input to the input terminals D0-D11 and stored therein. Incidentally, the values can be output sequentially starting from the most significant bit, or from the least significant bit.

In the present embodiment, if the value input from the D0-D11 terminals is "0", then the value "0" is output to the OUT terminal; while if the value input from the D0-D11 terminals is "1", then the value "1" is output from the OUT terminal. When the value "1" is output from the OUT terminal, since the switch 30 is turned on, the signal (b) generated in the resonant circuit 10 will rapidly fade out.

Therefore, the output value of the detection circuit 12 will become "0" immediately. On the other hand, a pulse signal having a predetermined width of about 70 μS is constantly supplied to the CLK terminal of the parallel/serial converting circuit 29 by the pulse-generating circuit 15. Further, the parallel/serial converting circuit 29 is configured in such a manner that, when the value "1" is output from the OUT terminal thereof, the pulse width of the signal output from the OUT terminal is the same as the pulse width of the signal input from the CLK terminal.

In one example, the final value of the measurement time T measured in the present embodiment is 2000, and the cycle of a signal transmitted from the tablet is 2 μS, for example. If continuous variable detection is performed by using a device having the configuration as described in Japanese Unexamined Patent Application Publication No. H07-175572, about 4 mS will be necessary for the detection. However, in the present embodiment, if the detection is performed in a condition in which T1=230 and T2=160 for example, only 780 μS is necessary for the detection.

Further, if the detection is performed by using the method described in Japanese Unexamined Patent Application Publication No. 2005-165768, since the time constant corresponding to T1 has to be measured twice, at least 1.24 mS will be necessary.

It is to be understood that the present invention is not limited to the embodiments described above, and various modifications can be made without departing from the spirit and scope of the present invention.

For example, although respective functions of the control circuit, the counter, the adder circuit, the parallel/serial converting circuit and the like are achieved by employing respective dedicated circuits in the illustrated embodiments, the present invention also includes a configuration in which these functions can be collectively achieved by employing a microprocessor.

Further, although the discharging time of the variable capacitor is measured in the illustrated embodiments, the present invention also includes a configuration in which a charging time period of the variable capacitor is measured. Even further, the present invention also includes a configuration in which a value, generated based on the minimum capacitance of the variable capacitor, is predetermined, a circuit for subtracting the predetermined value is provided, and the output value changes from zero. Still further, the present invention also includes a configuration in which a circuit is provided for not allowing the output value to exceed a predetermined value.

Although the measurement is performed by employing two counters in the illustrated embodiments, the present invention includes a configuration in which the result of an initial measurement is stored in a buffer, so that only one counter is required.

In the illustrated embodiments, in order to make the description easier to be understood, the information to be transmitted is limited to the pen pressure. However, other information, such as switching information, unique ID information, and the like, can be transmitted alternatively or additionally. Further, although the ratio between two time constants is set to eight times in the illustrated embodiments, the present invention is not limited thereto. Further, the values of the two detection voltages V1 and V2 are not limited to those described in the illustrated embodiments.

Further, in the illustrated embodiments, the data is transmitted by short-circuiting the resonant circuit. However the data can be transmitted by slightly changing the resonance frequency. Further, the data can be transmitted by controlling other characteristics of the resonant circuit.

What is claimed is:

1. A position indicator for encoding operational information represented by a continuous variable and transmitting the encoded operational information to a tablet, comprising:
   a time-constant circuit configured to encode the operational information represented by a continuous variable;
   a voltage comparison circuit; and
   a detection voltage setting circuit,
   wherein
      the time-constant circuit includes a plurality of time-constant sub-circuits configured to be selectively switched among them, the plurality of time-constant sub-circuits each having an element whose characteristic continuously changes in response to the operational information represented by a continuous variable and each having a time constant which changes in response to a change in the characteristic of the element, each time constant having a different variable range,
      the detection voltage setting circuit selectively outputs a voltage value from a plurality of voltage values,
      the voltage comparison circuit compares a voltage output from the time-constant circuit with a voltage output from the detection voltage setting circuit, and
      based on the comparison result, the time constant of the time-constant circuit and the voltage value output from the detection voltage setting circuit are changed.

2. The position indicator according to claim 1, wherein
   a voltage output by the time-constant sub-circuit whose time constant is set to change in a first variable range and a first detection voltage output by the detection voltage setting circuit are supplied to the voltage comparison circuit where both of the voltages are compared with each other, and a time period corresponding to an output of the comparison result is obtained as a first measured value,
   upon obtaining the first measured value, a voltage output by the time-constant sub-circuit whose time constant is set to change in a second variable range and a second detection voltage output by the detection voltage setting circuit are supplied to the voltage comparison circuit where both of the voltages are compared with each other, and a time period corresponding to an output of the comparison result is obtained as a second measured value, and
   the operational information represented by a continuous variable is encoded based on the first measured value and the second measured value.

3. The position indicator according to claim 2, wherein the measured value represents a time period, from the time when charging or discharging of the time-constant circuit is started, where the detection voltage of the detection voltage setting circuit is set to a predetermined voltage value, to the time when the voltage comparison circuit detects that the voltage of the time-constant circuit has reached the predetermined voltage value.

4. The position indicator according to claim 2 further comprising a counter, wherein the operational information represented by a continuous variable is encoded by counting counter pulse signals corresponding to the first measured value and the second measured value.

5. The position indicator according to claim 4, further comprising: a resonant circuit including a coil and a capacitor; and a switch for short-circuiting the resonant circuit,
   wherein the operational information represented by a continuous variable, encoded based on the first measured value and the second measured value, is transmitted to the tablet by controlling the switch based on a counted value of the counter.

6. The position indicator according to claim 2, further comprising a continuous variable calculating section for calculating a continuous variable representing an operation performed on the element based on the first measured value, the second measured value, and a ratio between the two variable ranges of the time constants.

7. The position indicator according to claim 1, wherein the element included in the time-constant circuit comprises a variable capacitor whose capacitance changes when the position indicator is being operated.

8. The position indicator according to claim 7, wherein the time-constant circuit further comprises resistors configured to be selectively switched therebetween.

9. The position indicator according to claim 1, wherein the plurality of time-constant sub-circuits share the same element whose characteristic continuously changes in response to the operational information represented by a continuous variable.

10. A method for detecting a continuous variable, comprising:
   obtaining, as a first measured value, a time period from the time when charging or discharging of a time-constant circuit is started where a time constant of the time-constant circuit is set to vary in a first range, and a detection voltage of a voltage comparison circuit is set to a first voltage value, to the time when a voltage comparison circuit detects that a voltage of the time-constant circuit has reached a value equivalent to the first voltage value;

setting, upon obtaining the first measured value, the time constant of the time-constant circuit to vary in a second range and the detection voltage of the voltage comparison circuit to a second voltage value, and obtaining, as a second measured value, a time period from the time when the first measured value has been obtained to the time when the voltage comparison circuit detects that the voltage of the time-constant circuit has reached a value equivalent to the second voltage value; and encoding operational information represented by a continuous variable based on the first measured value and the second measured value, and transmitting the encoded operational information to a tablet.

11. A position indicator for encoding operational information represented by a continuous variable and transmitting the encoded operational information to a tablet, comprising:

a time-constant circuit configured to encode the operational information represented by a continuous variable;

a voltage comparison circuit; and a detection voltage setting circuit, wherein the time-constant circuit includes a plurality of time-constant sub-circuits configured to be selectively switched among them, the plurality of time-constant sub-circuits each having an element whose characteristic continuously changes in response to the operational information represented by a continuous variable and each having a time constant which changes in response to a change in the characteristic of the element, each time constant having a different variable range, wherein the detection voltage setting circuit selectively outputs a voltage value from a plurality of voltage values, and wherein the voltage comparison circuit compares a voltage output from the time-constant circuit with a voltage output from the detection voltage setting circuit.

* * * * *